United States Patent [19]

Xu et al.

[11] Patent Number: 4,961,268

[45] Date of Patent: Oct. 9, 1990

[54] MODULAR METHOD AND SYSTEM FOR SETTING FIXED-ANGLES OF MODULAR TOOLS

[75] Inventors: Changxiang Xu; Oiulin Yu; Ruixing Zhuo, all of Gui-Zhou, China

[73] Assignees: Qing-Yang Machine Works, Gui-Zhou; China National Aerotechnology Import and Export Corp., Beijing, both of China

[21] Appl. No.: 315,409

[22] Filed: Feb. 23, 1989

[30] Foreign Application Priority Data

Feb. 29, 1988 [CN] China .................... 88100600.9

[51] Int. Cl.⁵ .................................................. B23Q 3/04
[52] U.S. Cl. ........................................ 33/568; 269/57; 269/69
[58] Field of Search .............. 33/568, 569, 570, 534, 33/537, 538, 613, 573; 269/56, 57, 59, 63, 69, 900, 208

[56] References Cited

U.S. PATENT DOCUMENTS

| | | | |
|---|---|---|---|
| 2,079,323 | 5/1937 | Kokotiak | 33/569 |
| 2,345,312 | 3/1944 | Sorensen | 33/569 |
| 2,369,425 | 2/1945 | Becker | 33/570 |
| 2,881,667 | 4/1959 | Ebert | 269/69 |
| 3,090,633 | 5/1963 | Farnsworth | 33/569 |
| 3,125,904 | 3/1964 | Olivieri | 33/569 |
| 3,165,840 | 1/1965 | Woditsch | 33/569 |
| 3,188,078 | 6/1965 | Peterson | 33/570 |
| 3,541,694 | 11/1970 | Schafer | 33/570 |
| 3,766,666 | 6/1973 | Sutter | 33/537 |
| 4,341,020 | 7/1982 | Bailey | 33/DIG. 1 |

FOREIGN PATENT DOCUMENTS 1098720  2/1961  Fed. Rep. of Germany ........ 33/570

Primary Examiner—William A. Cuchlinski, Jr.
Assistant Examiner—Diego F. F. Gutierrez
Attorney, Agent, or Firm—Helfgott & Karas

[57] ABSTRACT

A modular method and system for setting fixed angles or revolving triads of interlocking holes of a hole type modular tooling system which are critically embodied in seven fixed-angle setting disks in each of which there are a few triads of holes that form certain angles. Selective use of not more than two of four disks can set up any fixed angles in 0.5° increments, or selective use of not more than four of the seven disks can set up all the fixed angles in 30″ increments. This modular system offers full angular adjustability, and permits precise and fast setups of small and compact constructions with good rigidity and stability.

4 Claims, 5 Drawing Sheets

MODULAR METHOD AND SYSTEM FOR SETTING FIXED-ANGLES OF MODULAR TOOLS

BACKGROUND OF THE INVENTION

This invention relates to jigs and fixtures, and particularly to a novel modular method and system for setting fixed-angles by revolving triads of interlocking holes of a modular tooling system.

An unrestricted workpiece has six degrees of freedom with respect to the axes of a coordinate system: three along-axis-moving degrees and three around-axis-revolving degrees as schematically shown in see FIG. 13. For the workpiece to be machined, the relative degrees of freedom must be restricted by a jig or fixture as shown for example, in FIG. 14. So, evidently, if any workpiece is to be fixed in a modular tooling system, the interlocking features of the system must be albe to freely move along and revolve around the axes for the features to be adjusted where they are necessary for constructing fixture bodies and fixing locators or clamps. In other words, a good modular tooling system should have two kinds of adjustability, along and around the coordinate axes. Since the advantage of slots is that they offer adjustability along axes, and holes provide adjustment around axes, the available hole type modular tooling system must be improved to offer the full adjustability by:

1. introducing slots into the hole type system to solve the problem of adjustability along axes and,
2. bringing the advantage of adjustability around hole axes into full play.

The solution of adjustability around the axes is covered by this patent application, and adjustability along the axes is covered in a separate pending patent application.

Since the above-mentioned principles for modularizing of jigs and fixtures are proposed by the inventors after their thorough study of the available modular tooling technology, this invention is based on also such principles.

There have been many styles of fixed-angle constructions in the scope of available jigs and fixtures, but generally speaking these constructions may be divided into three types: stable, adjustable, and modular, and the adjustable unit may further be divided into the direct adjustor and the comparator adjustor. The stable or non-re-adjustable type is a kind of unreadjustable constructions fabricated specially for a certain workpiece and operation. The adjustable type is a kind of units adjustable to the change of workpieces and operations. The modular construction is what is assembled with premanufactured modules from a modular angling system, and is dismountable for subsequent assemblies after use. The direct adjustor is a unit adjustable to a certain angle without rigging and indicating, and the comparator-adjust or type must be operative by rigging and indicating. U.S. Pat. Nos. 165,840, 3,736,666 and 341,020 are of the direct adjustor type, while the present invention is of the modular angling type. The stable construction can provide a more compact and more rigid structure than the adjustable construction, but can not offer angular adjustability and modularity. The comparator-adjustable unit can provide stepless angles and a compact construction over the direct adjustor, but can not be set up precisely and fast because of the necessity of rigging and indicating, and can not offer rigidity and stability because they hold a workpiece only by friction. A complete modular angling system should comprise a set of angular modules which can selectively be assembled into various constructions of different angles without readjustability, that is, the modular angling system may be a complete system which can offer advantages of the adjustable unit, and the assembled modular construction may be the same as the stable or non-adjustable construction is. However, of the available hole type modular tooling systems there has been no one which can provide the modular style of angular constructions, and of the available slot type modular tooling systems there have been only one or two systems which have been using fixed-angle setting pads or supports in some common angles that do not essentially have angular modularity; in all the available systems including hole and slot types, what has been in common use is the adjustable angular unit, that is, almost none of the available systems has related to the modular anglig system.

SUMMARY OF THE INVENTION

It is an object of the present inventoin to provide a modular method and system for setting fixed-angles by revolving triads of interlocking holes of a hole type modular tooling system, so as to bring the advantage of adjustability around hole axes into full play, and thus to rationalize fixed-angle constructions of modular tools.

The method for setting fixed angles of modular tools according to the invention comprises the steps of providing a plurality of fixed angle setting disks, providing a plurality of dowel pins and forming angle-predetermined triads of interlocking holes of a modular tooling system in said disks, defining dowelling formulas of said disks from a table or CAD library, and setting up any fixed angles of modular tools by turning said triads of holes around a symmetrical central axis thereof relative to coordinate axes of a plate, said axes including with one another an angle of 90° in a fine angular increment, and by coaxially dowelling said disks on said plate, in accordance with said dowelling formulas.

A modular system for setting fixed angles of modular tools according to the invention comprises a plurality of fixed-angle setting disks each formed with a plurality of triads of interlocking holes of a modular tooling system, which include therebetween premanufactured, predetermined angles, each of said traids of holes having two holes which are aligned with one another symmetrically relative to one through hole, and a plurality of dowel pins for aligning interlocking holes, all through holes in said disks being aligned with each other and being each a central hole of each of said disks.

BRIEF DESCRIPTION OF THE DRAWINGS

In the Drawings:

FIG. 11b is an exploded perspective view of the construction of FIG. 11a;

DETAILED DESCRIPTION OF THE PREFERRED EMBODIMENTS

Figure 1:
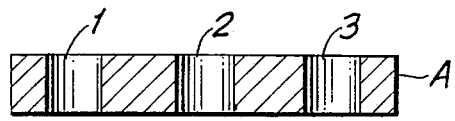
FIG. 1 is a sectional view through the triad of interlocking holes in a the fixed-angle setting disk of the hole type modular tooling system in accordance with the invention.

FIG. 1 illustrates a construction element A provided with the triad of holes of the hole type modular tooling system in accordance with the invention, wherein holes 1 and 3 are qualified for the insertion thereinto of dowel pins and hole 2 is provided for bolts. In other words, the holes in baseplates and constructing elements of the hole type system are spaced with one qualified hole after one tapped hole along coordinate axes. Since the qualified and tapped holes are either the interlocking hole of modular construction element for fixture bodies or the fixing hole of locators and clamps, these holes must be able to freely move along and revolve around axes for the holes to be adjusted where they are necessary for constructing fixture bodies and for fixing locators or clamps. The typical adjustment around axes involves the revolving of the triad of holes around their own symmetrical cener line.

Figure 2:
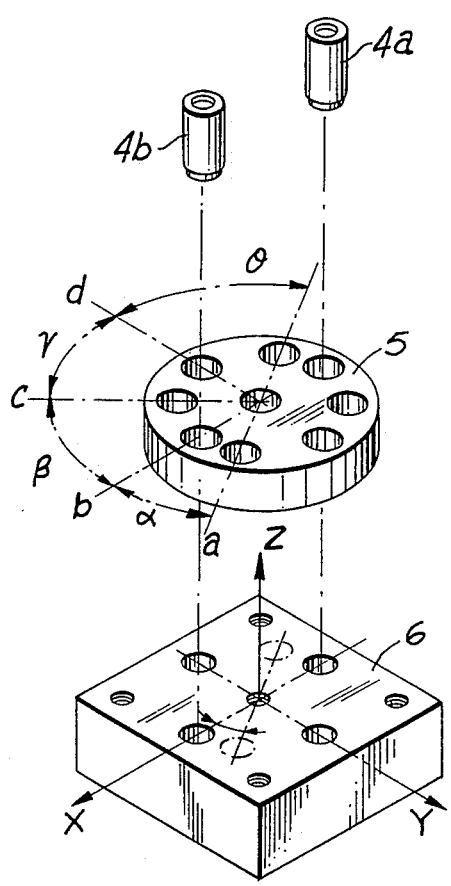
FIG. 2 is an exploded perspective view illustrating the principle for revolving of the triad of interlock holes for setting fixed-angles of modular tools in accordance with the invention.

FIG. 2 illustrates the principle of revolving the triad of holes. When dowel pins 4a and 4b align triad holes b of disk 5 with triad holes X of a plate 6, the position of triad holes a of the disk 5 is that of the triad X of the plate 6 after disk 5 it is revolved by an angle $\alpha$, that is, in this case the revolving of disk 5 has made triad holes X of the plate 6 revolve around their symmetrical central line by an angle $\alpha$. In fact, using revolving angles $\alpha$, $\beta$ and $\gamma$ of disk 5, the coordinate angle 90° of plate 6 and dowel pins 4a, 4b for aligning the selected holes one can obtain almost 48 different angles below 360°: $\pm \alpha$, $\pm \beta$, $\pm \gamma$, $\pm \theta = 180° - \alpha - \beta - \gamma$, $\pm (\alpha + \beta)$, $\pm (\beta + \gamma)$, $\pm (\gamma + \theta)$, $\pm (\theta + \alpha)$, $\pm (90° \pm \alpha)$, $\pm (90° \pm \beta)$, $\pm (90° \pm \beta)$, $\pm (90° \pm \gamma)$, $\pm (90° \pm \theta)$, $\pm [90° \pm (\alpha + \beta)]$, $\pm [90° \pm (\beta \pm \gamma)]$, $\pm [90° \pm (\gamma + \theta)]$ and $\pm [90° \pm (\theta \pm \alpha)]$.

Figure 3:
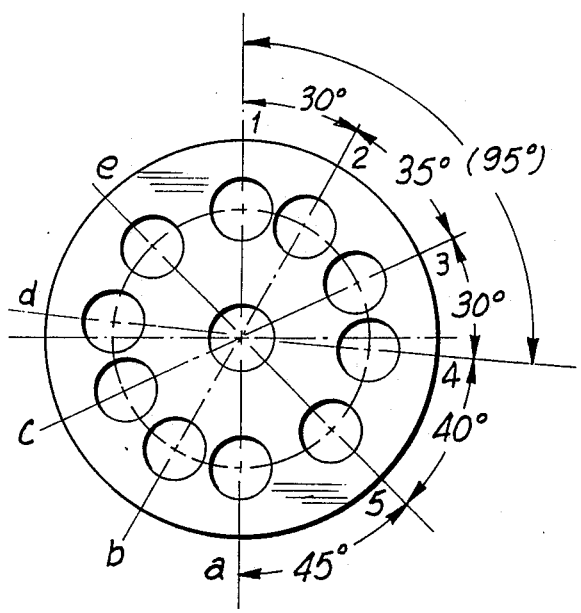
FIGS. 3 to 9 are respectively top views of the fixed-angle setting disks for 5°, 1°, 0.5°, 10°, 5′, 1′ and 0.5′ adjustment, of the elements of the embodiment of the invention.

As seen from FIG. 3, the disk called 5° has angles: 30° between triads of holes a-1 and b-2, 35° between triads of holes b-2 and c-3, 30° between triads of holes c-3 and d-4, and 40° between triads of holes d-4 and e-5. By means of such disk one can, by aligning on the plate 6 by means of dowel pins obtain fixed angles under 90°: 5°, 15°, 20°, 25°, 30°, 35°, 40°, 45°, 50°, 55°, 60°, 65°, 70°, 75°, and 85°, which are all angles except 10° and 80° in 5° increments starting from 0°. To provide angles of 10° and 80°, one can use a disk named 10°.

Figure 4:
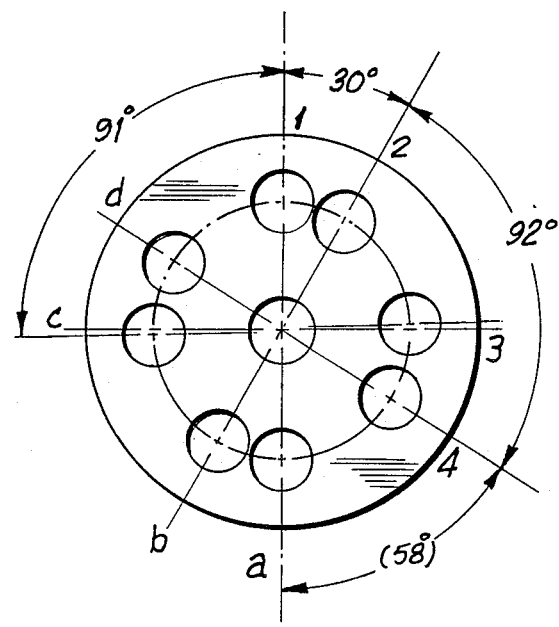

As shown in FIG. 4, in the disk called 1° for 1° adjustment, there are angles of 91° or 89° between triads of holes a-1 and c-3, and 92° or 88° between triads of holes b-2 and d-4. 91° minus 90° equals 1°, 92° minus 90° equals 2°, 5° minus 2° equals 3°, 5° minus 1° equals 4°, 5° plus 1° equals 6°, ... etc. Thus we can, using the disk on the base of angles in 5° increments starting from 0°, obtain any angles in 1° increments.

Figure 5:
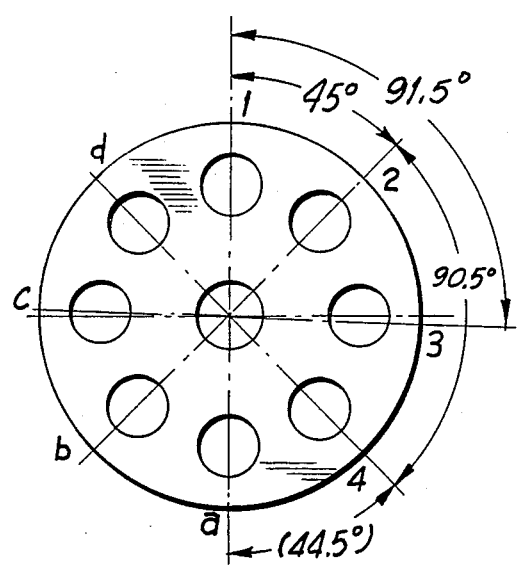

In the disk called 0.5° (see FIG. 5), there are angles of 90.5° between triads of holes b-2 and d-4, and 91.5° between triads of holes a-1 and c-3, 90.5° minus 90° equals 0.5°, 91.5° minus 90° equals 1.5°, 5° minus 1.5° equals 3.5°, 5° minus 0.5° equals 4.5°, 5° plus 0.5° equals 5.5°, and so on, so that if we have another disk providing 2.5°, using the disk called 0.5° and the disk having 2.5°, we can use any angles with an odd degree of 0.5° on the base of angles in 5° increments from 0°.

Figure 6:
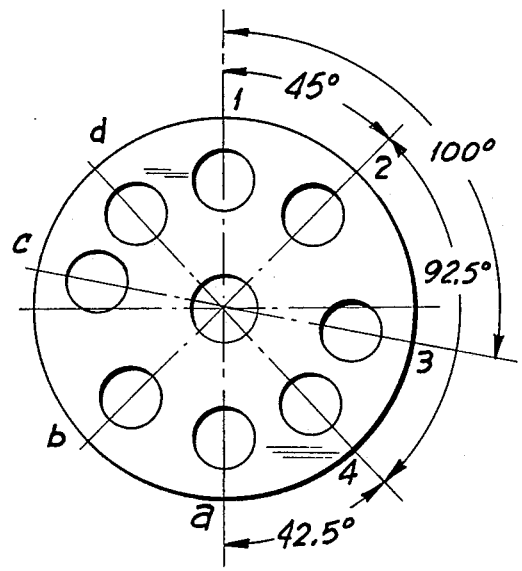

The disk shown in FIG. 6, named 10° is actually used to provide the angles of 10° and 2.5° and has angles of 100° between triads of holes a-1 and c-3, and 92.5° between triads of holes b-2 and d-4.

Since both the angle ending with 0.5° and the angle ending with integral degrees are produced on the base of angles in 5° increments from 0°, setting of any fixed angles in 0.5° increments needs at the time not more than 2 disks selected from 4 disks shown in FIGS. 3 to 6.

Figure 7:
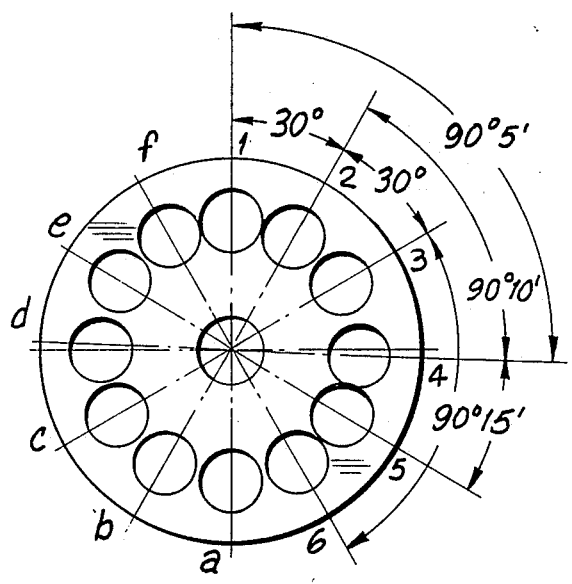

The disk called 5' shown in FIG. 7 has angles: 90° 5' between triads of holes a-1 and d-4, 90° 10' between triads of holes b-2 and e-5, and 90° 15' between triads of holes c-3 and f-6. 90° from 90° 5' equals 5', 90° from 90° 10' equals 10', 90° from 90° 15' equals 15', 10' from 30' equals 20', 6' from 30' equals 25', 30' plus 5' equals 35', ... etc. Thus we can, using this disk on the base of angles in 0.5° increments from 0°, obtain all the angles in 5' increments.

In the disk called 1'-adjustment (see FIG. 8), there are two angles, one 90° 1' between triads of holes a-1 and c-3, and another 90° 3' between triads of holes b-2 and d-4, so that by means of this disk we can obtain all the angles in 1' increments on the base of angles in 5' increments from 0° as 90° 1' minus 90° equals 1', 5' minus 3' equals 2', 90° 3' minus 90° equals 3', 5' minus 1' equals 4', 5' plus 1' equals 6', ... etc.

In the disk called 0.5' (see FIG. 9), there are angles of 90° 30'' between triads of holes a-1 and d-4, 90° 1'30'' between triads of holes b-2 and e-5, and 90° 2'30'' between triads of holes c-3 and f-6, so that by using of this disk we can obtain any angles with an odd degree of 30'' on the base of angles in 5' increments from 0° as 90° 30'' minus 90° equals 30'', 90° 1'30'' minus 90° equals 1'30'', 90° 2'30'' minus 90° equals 2'30'', 5' minus 1'30'' equals 3'30'', 5' minus 30'' equals 4'30'', 5' plus 30'' equals 5'30'', ... etc.

Figure 8:
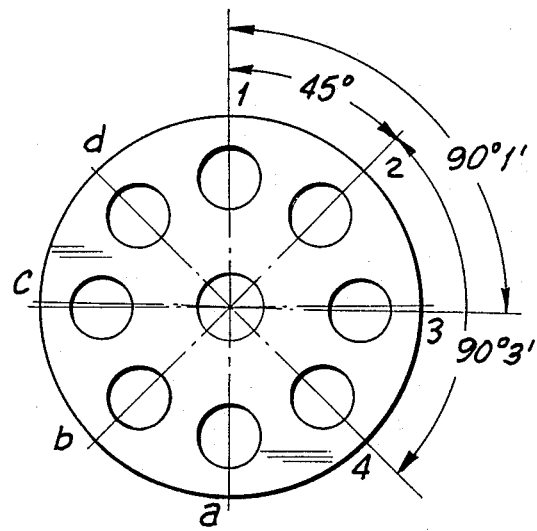
Figure 9:
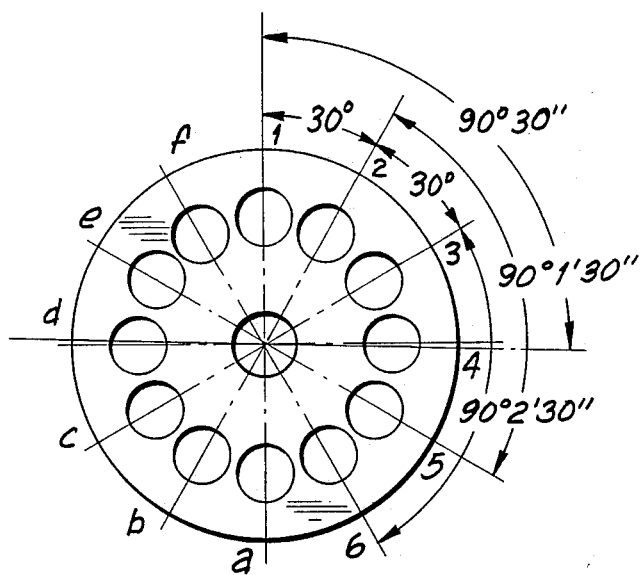

Since both the angle ending with 0.5' and the angle ending with integral minutes are produced on the base of angles in 5' increments from 0°, setting of any fixed angles from 0.5° to 0.5' increments further needs at the time not more than 2 disks from 3 disks shown in FIGS. 7 to 9.

Therefore, on the plate 6 with coordinate angle 90°, we can set up by means of the disks and dowel pins any fixed angles in 5° increments from 0° by using only one of the two disks shown in FIGS. 3 and 6, any fixed angles in 1° increments from 0° by using not more than 2 of the three disks shown in FIGS. 3, 4 and 6, any fixed angles in 0.5° increments from 0° by using not more than 2 of the four disks shown in FIGS. 3 to 6, any fixed angles in 5' increments from 0° by using not more than 3 of the five disks shown in FIGS. 3 to 7, any fixed angles in 1' increments from 0° by using not more than 4 of the six disks shown in FIGS. 3 to 8, or any fixed angles in 0.5' increments from 0° by using not more than 4 of the seven disks shown in FIGS. 3 to 9. In other words, we can set up on the plate 6 43,200 different angles below 360° merely by combination of 18 effective angles in the seven disks, and not more than four disks will be used in each combination and the total height of four disks will be only 50 mm.

Figure 10:
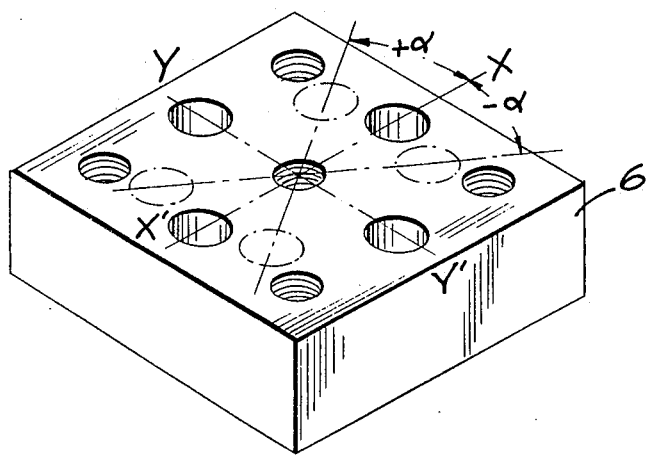
FIG. 10 is a perspective view illustrating the designation of holes in a plate relative to X—X' and Y—Y' axes when the disk of the preferred embodiment is used to set fixed angles.

When using the disk of the preferred embodiments to revolve the triad of holes by a fixed angle, we must:
1. designate the holes in the plate relative to X–X' axes and Y–Y' and ensure that the angle α to be set is less than or equal to 45° from axis X–X' (see FIG. 10);
2. find out the dowelling formula for the above-mentioned angle α from a table or CAD library; and
3. select and align the disks with dowel pins according to what is indicated by the dowelling formula.

Figure 11A:
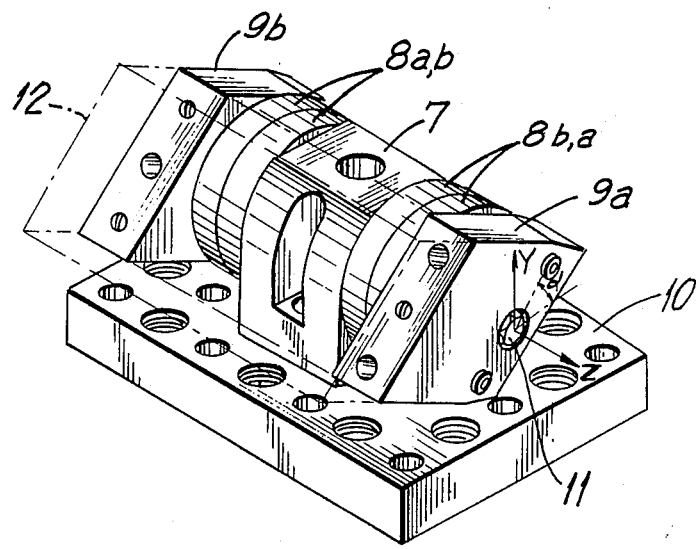
FIG. 11a is a perspective view of a vertical angular construction built up by some selective disks in accordance with FIGS. 3 to 9.
Figure 11B:
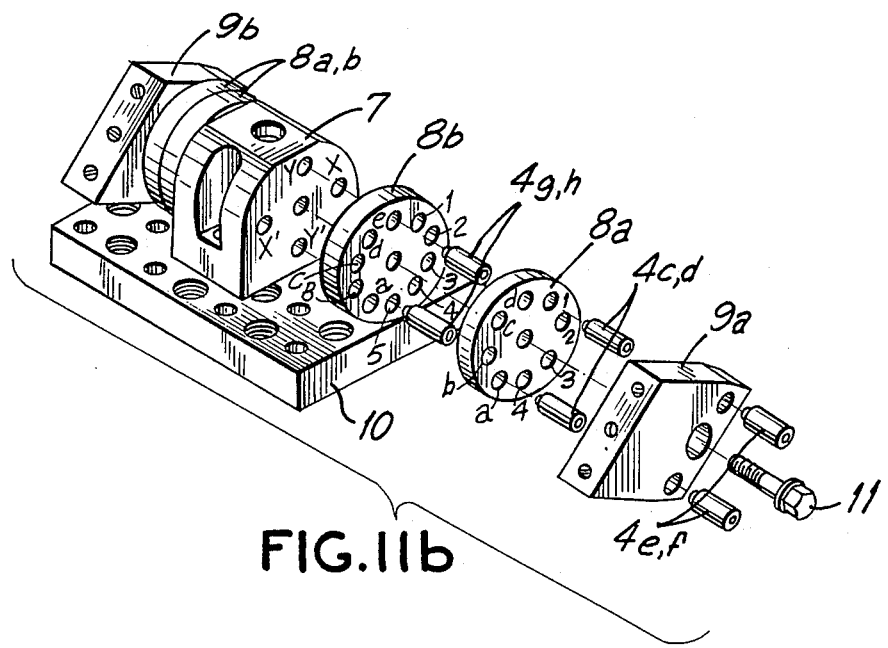

FIG. 11a illustrates a vertical angular construction set up with the disks and plates of the preferred embodiments, and FIG. 11b is an exploded view of FIG. 11a. In this practical application, the angle α to be set is 41° 30'. The tabular dowelling formula for the angle is:

$$\frac{D}{Y'-Y} \rightarrow \frac{H322500}{5\text{-}e/4\text{-}d} \rightarrow \frac{H322030}{3\text{-}c/1\text{-}a}.$$

According to this formula, dowel disk 8b (H322500) is supported on angling datum support 7 corresponding to the above-described plate by aligning triads of holes 5-e with Y'–Y, disk 8a (H322030) is supported on disk 8b by aligning triads of holes 3-c with 4-d and angling blocks 9a and 9b are supported on disks 8a by aligning the qualified holes of the angling blocks 9a and 9b with triads of holes 1-a, and then the angling blocks 9a and 9b and the disks 8a and 8b are fastened to the angling datum support 7 by bolts 11. The angling datum support 7 is further dowelled and fastened on a base plate 10 by other dowel pins and the bolt. When dowelling and fastening a base plate 12 onto angling blocks 9a and 9b, we obtain the angular construction for developing of angle 41° 30'.

To set up a compound angle, we can selectively use again some disks either under angling datum support 7 to make it revolve around axis Y for another angle or to make baseplate 10 with the whole angular construction thereon revolve for a fixed angle.

Figure 12:
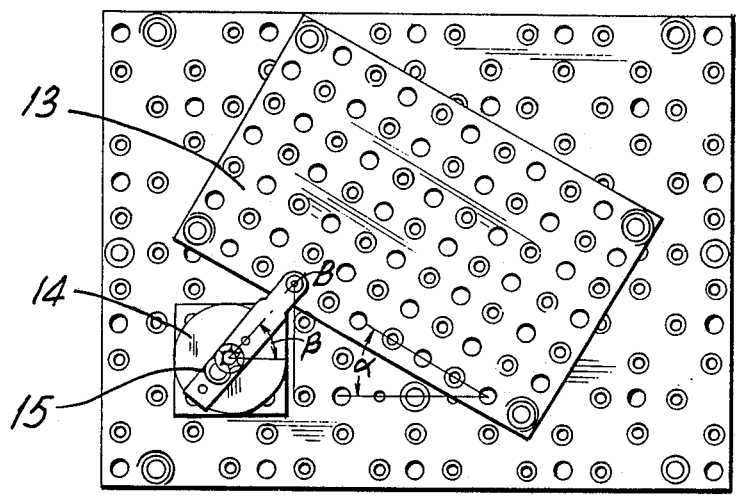
FIG. 12 is a top view of a horizontal angular construction built up by means of some selective disks in accordance with FIGS. 3 to 9.
Figure 13:
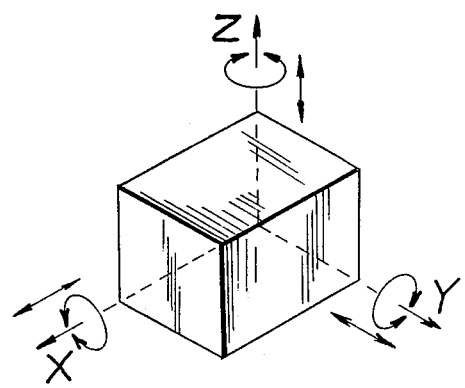
FIG. 13 is a perspective view illustrating six degrees of freedom of an unrestricted workpiece.
Figure 14:
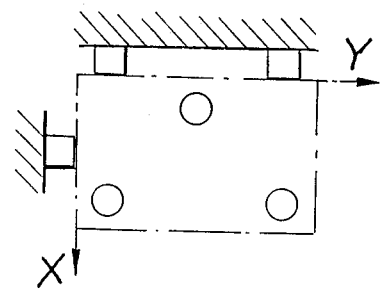
FIG. 14 is a view illustrating six locating points for jigs and fixtures.

FIG. 12 illustrates a horizontal angular construction set up with the elements of the preferred embodiments. In this practical application, α is the final angle to be set, and β is the conversion angle of α. Jig plate 15 can slip in the direction of angle β. When the bush hole of slipping jig plate 15 coincides with the relative hole B of revolving baseplate 13 for receiving a dowel pin, the baseplate 13 can be revolved by the angle α.

Therefore, the modular angling system of the invention can offer full angular adjustability, and permits precise and fast setups of small and compact constructions with good rigidity and stability.

We claim:

1. A modular method for setting fixed angles of modular tools, comprising the steps of providing a plurality of fixed angle setting disks, providing a plurality of dowel pins and bolts, forming predetermined-angle triads of interlocking holes of a modular tooling system in said disks, defining dowelling formulas for said disks from a table or CAD library, and setting up any fixed angles of modular tools by turning said triads of holes around a symmetrical central axis thereof relative to coordinate axes of a plate, said axes including with one another an angle of 90° in a fine angular increment, and by coaxially dowelling said disks on said plate, in accordance with said dowelling formulas.

2. The method according to claim 1, wherein any said fixed angles in 5° increments from 0° are set up relatively to the coordinate axes of said plate by differently dowelling a selective one of a set of two of said disks onto said plate, any said fixed angles in 1° increments from 0° are set up by coaxially dowelling at most two of said disks selected from a set of three of said disks onto said plate, any said fixed angles in 0.5° increments from 0° are set up by coaxially dowelling at most two disks selected from a set of four of said disks onto said plate, any said fixed angles in 5' increments from 0° are set up by coaxially dowelling at most three disks selected from a set of five said disks onto said plate, any fixed angles in 1' increments from 0° are set up by coaxially dowelling at most four disks selected from a set of six of said disks onto said plate, and any said fixed angles in 0.5' increments from 0° are set up by coaxially dowelling at most four disks selected from a set of seven of said disks.

3. A modular system for setting fixed angles of modular tools, comprising a plurality of fixed-angle setting disks each formed with a plurality of triads of interlocking holes of a modular tooling system, which include therebetween premanufactured, predetermined angles, each of said triad of holes having two holes which are aligned with one another symmetrically relative to one through hole, and a plurality of dowel pins for aligning interlocking holes of different disks, all through holes in said disks being aligned with each other and being each a central hole of each of said disks.

4. The modular system according to claim 3, wherein said predetermined angles of each elementary fixed-angle setting disk formed by a symmetrical central line of the triad of holes are selected from the group including 30°, 35°, 40°, and 45°, whereby angles in 5° increments from 0° can be obtained.

* * * * *